United States Patent [19]

Sturtz et al.

[11] Patent Number: 4,662,809
[45] Date of Patent: May 5, 1987

[54] AUTOMATIC LEVEL DEVICE

[75] Inventors: Charles R. Sturtz; Peter J. McCallin, both of Orlando, Fla.

[73] Assignee: FMC Corporation, Chicago, Ill.

[21] Appl. No.: 781,444

[22] Filed: Sep. 27, 1985

[51] Int. Cl.⁴ .............................. B65G 67/02
[52] U.S. Cl. ...................... 414/347; 33/366; 200/188; 414/350; 414/401; 414/495; 414/584
[58] Field of Search ............... 414/340, 347, 349, 351, 414/396, 401, 495, 584, 138, 346, 350, 353; 33/366, 367; 244/137 R, 161; 200/188–190, 220

[56] References Cited

U.S. PATENT DOCUMENTS

| | | | |
|---|---|---|---|
| 1,600,121 | 9/1926 | Mazade | 200/190 X |
| 3,582,590 | 6/1971 | Eubank | 200/189 X |
| 3,589,490 | 6/1971 | Walkhoff et al. | 414/347 X |
| 3,687,321 | 8/1972 | Goodhart et al. | 414/495 |
| 3,854,610 | 12/1974 | Carder | 414/495 X |
| 3,912,289 | 10/1975 | Czajkowski, Jr. | 200/188 X |
| 3,939,470 | 2/1976 | Arai et al. | 200/190 X |
| 4,024,823 | 5/1977 | Ward et al. | 33/366 X |
| 4,506,450 | 3/1985 | Fleming et al. | 33/366 |
| 4,542,795 | 9/1985 | Yoshimura | 33/366 X |
| 4,554,535 | 11/1985 | Floris et al. | 33/366 X |

Primary Examiner—Robert J. Spar
Assistant Examiner—David A. Bucci
Attorney, Agent, or Firm—Lloyd B. Guernsey; H. M. Stanley; R. B. Megley

[57] ABSTRACT

An automatic level device for sensing the height and pitch of an aircraft and for adjusting a loader platform to align with the aircraft. An umbilical cord connected between the platform and the aircraft includes a tube partially filled with mercury and having a plurality of electrodes spaced along one end of the tube. As the height of the aircraft changes the mercury contacts a different number of electrodes and the electrodes provide signals for adjusting the level of the platform and aligning the platform with the aircraft.

6 Claims, 5 Drawing Figures

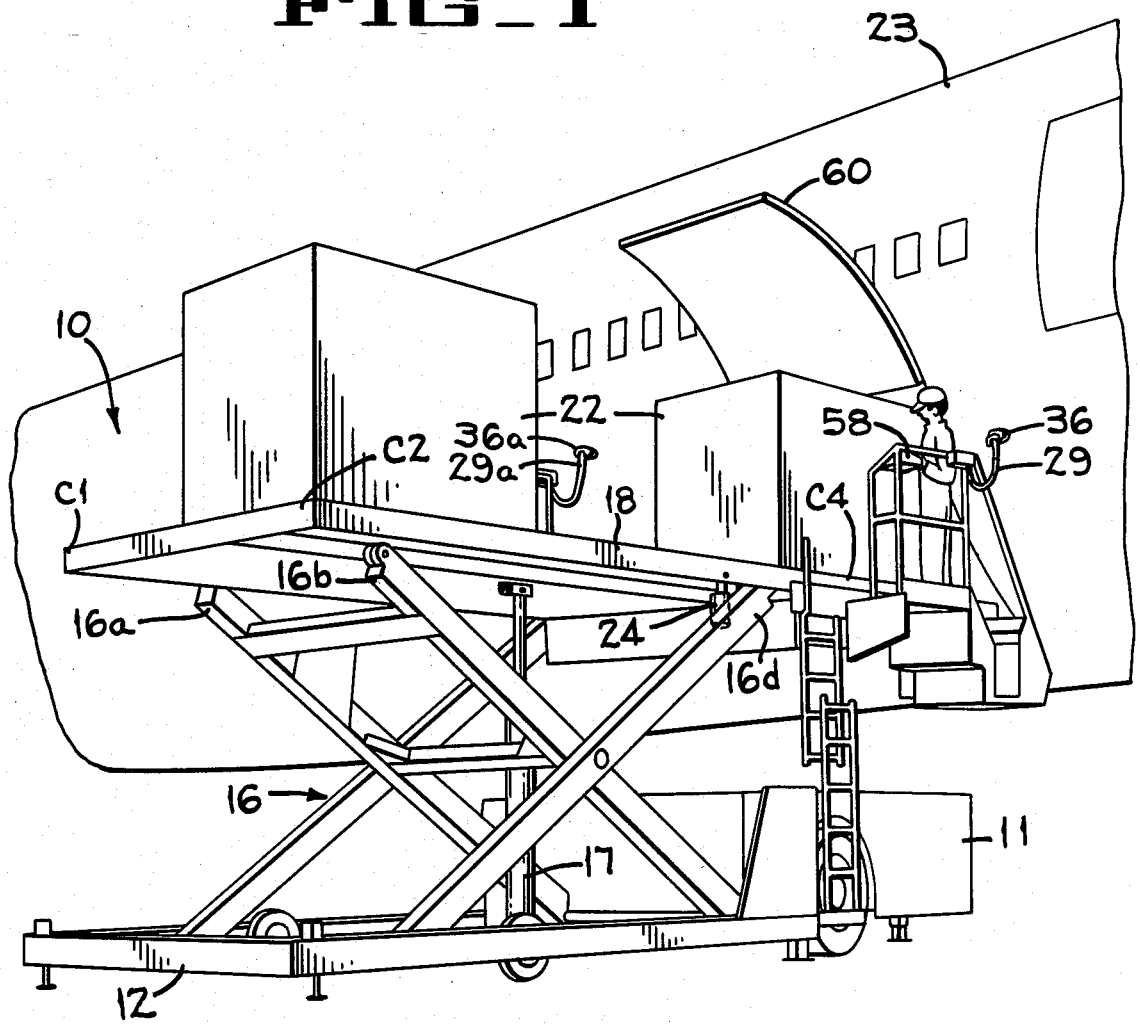
FIG_1

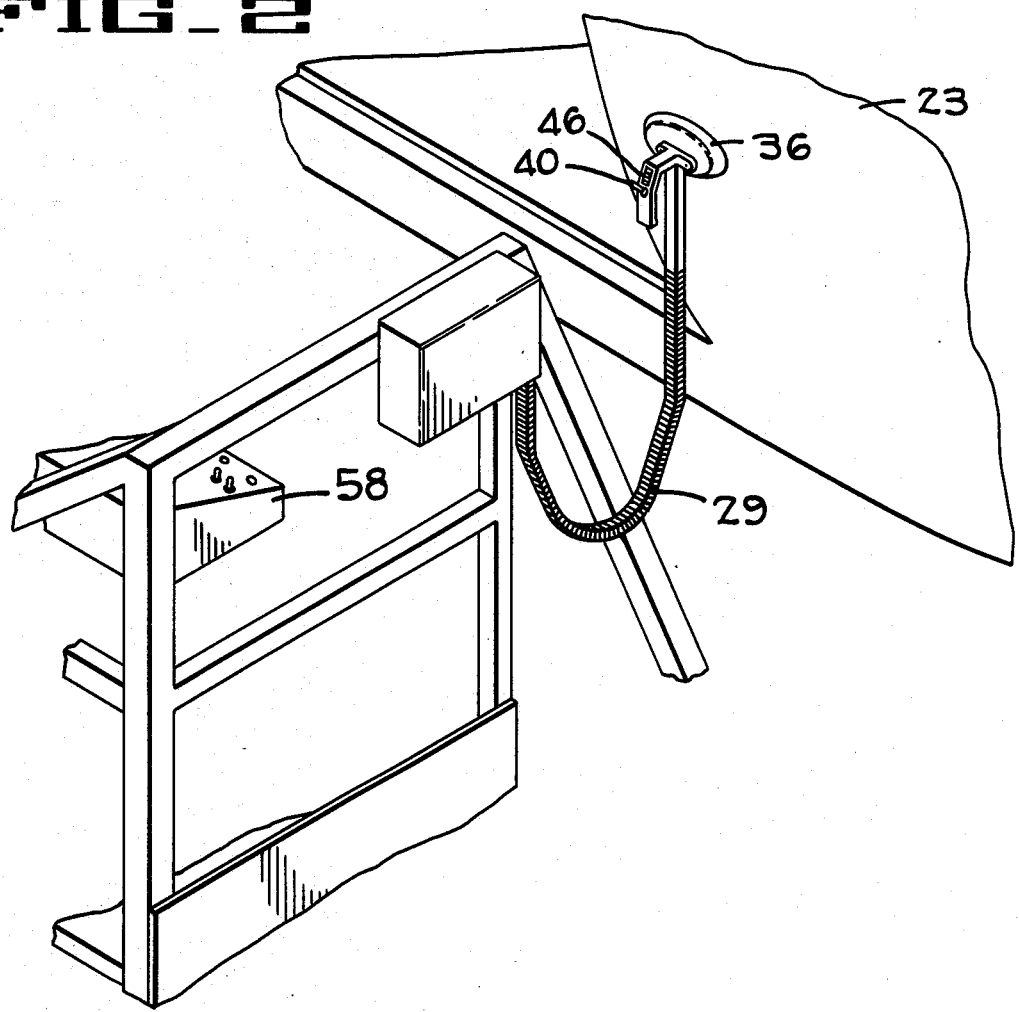
FIG_2
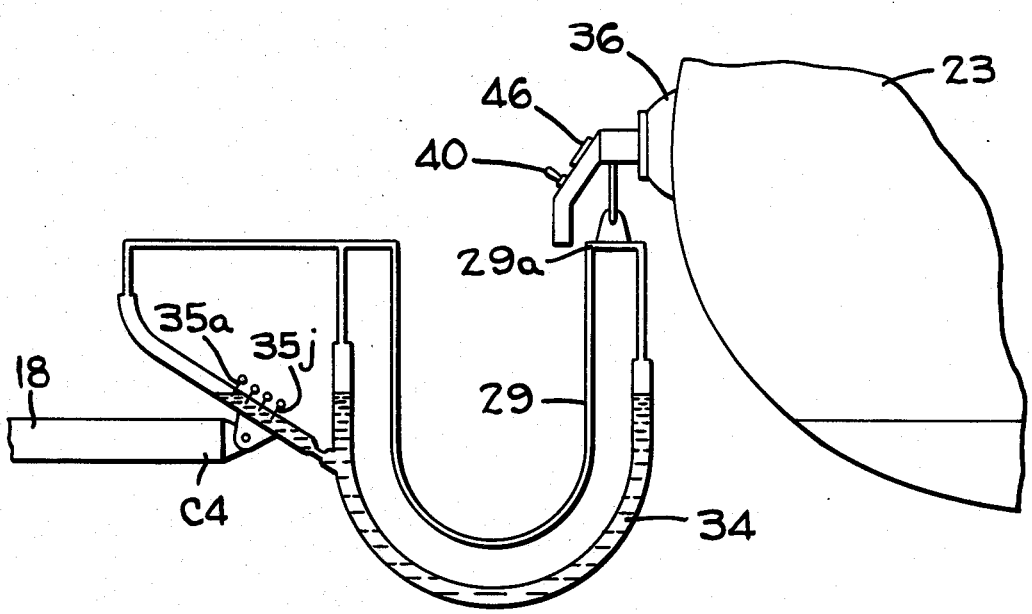
FIG_3

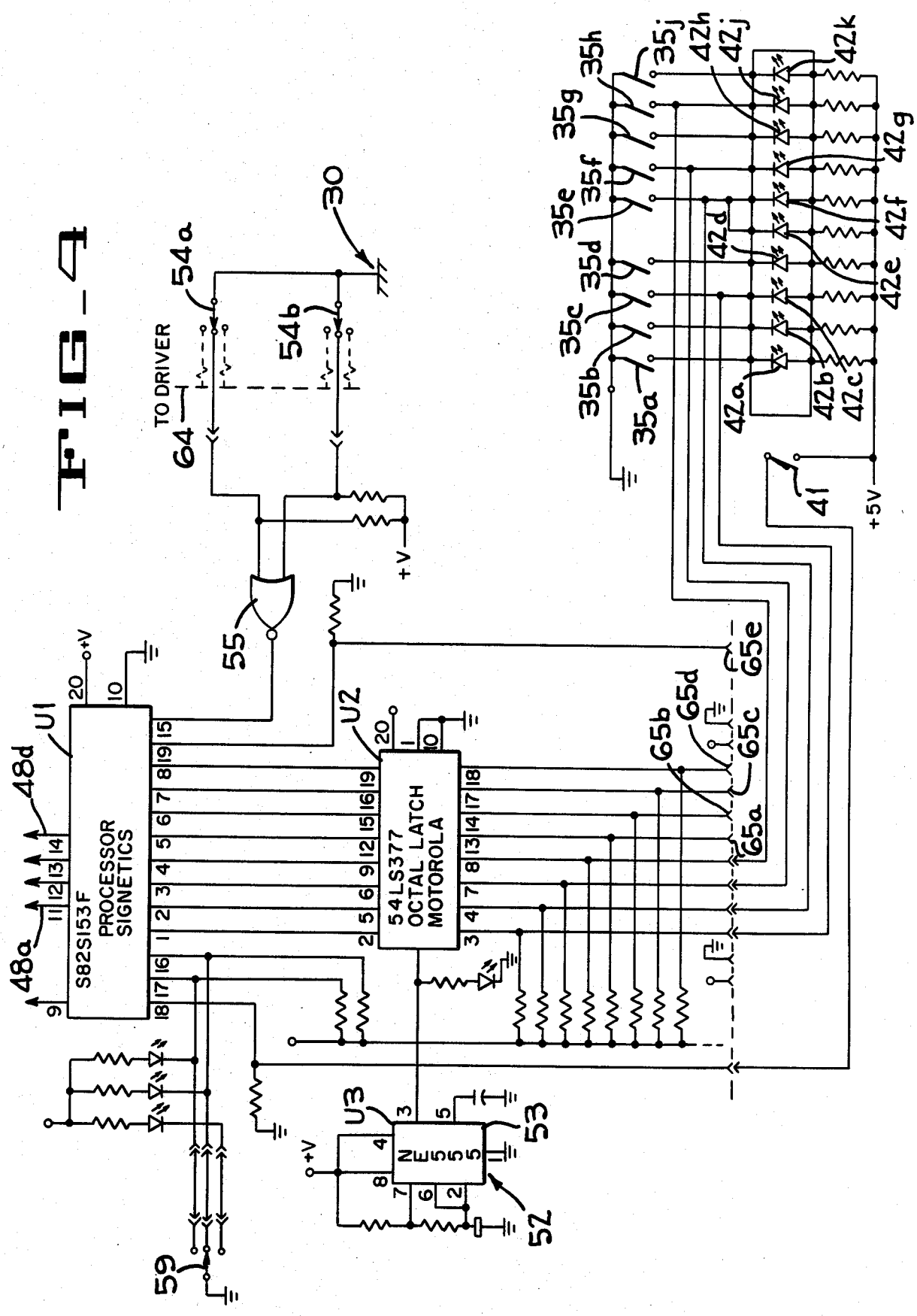
FIG_4

FIG. 5

FPLA PROGRAM TABLE

4,662,809

AUTOMATIC LEVEL DEVICE

BACKGROUND OF THE INVENTION

1. Field of the Invention

The present invention relates to cargo loading and unloading apparatus, and more particularly, to apparatus for maintaining the platform of an aircraft cargo loader level relative to the cargo door of an aircraft being serviced.

2. Description of the Prior Art

Apparatus for loading cargo into and unloading cargo from an aircraft are well known in the art and such apparatus is referred to herein as an aircraft cargo loader although it will be understood that the subject aircraft loading apparatus performs both loading and unloading functions.

These loaders transfer relatively small containers into and out of the aircraft through a cargo opening in the side of the aircraft, while the very large cargo aircraft can be loaded by opening a tilt-up nose to accommodate large containers. These loaders are self propelled and are driven into position adjacent the cargo opening and then connected to the aircraft by an adapter carried on a forward end of a vertically moving bridge. A main platform is disposed rearwardly of the bridge and is elevated between a low container receiving position and an elevated position where the forward end of the platform engages the rear end of the bridge to move the upper surfaces of both the bridge and platform into substantially planar alignment with the cargo supporting surface of the aircraft. Scissor assemblies are provided for guiding the bridge and platform during their vertical movement.

SUMMARY OF THE INVENTION

The automatic level device of the present invention provides apparatus for positioning the platform of a cargo loader in alignment with the cargo opening of an aircraft and for maintaining the platform in alignment during any up or down movement of the aircraft. A level sensor is connected between the cargo loader and the aircraft and used to sense a change in position of the aircraft relative to the cargo loader. The level sensor develops output signals which actuate hydraulic devices that raise or lower the platform of the cargo loader to maintain the loader in alignment with the aircraft.

The level sensor comprises an umbilical cord having a first end connected to an inboard end of the platform and having a suction cup connected to a second end of the umbilical cord. The umbilical cord includes a flexible tube partially filled with a conductive liquid such as mercury and having a plurality of electrodes spaced along the first end of the flexible tube with the electrodes extending through the wall of the tube. As the second end of the umbilical cord is raised and lowered the mercury makes contact with a different number of electrodes to provide signals which indicate the relative heights of the two ends of the umbilical cord. These signals are used to actuate a plurality of lamps to enable a human operator to secure the suction cup at an appropriate level on the side of the aircraft when the platform is moved into position for loading or unloading the aircraft. The same signals are used to automatically raise and lower the platform as the aircraft moves up and down due to a change in load in the aircraft or to other causes.

BRIEF DESCRIPTION OF THE DRAWINGS

FIG. 1 shows a scissors type container and pallet loader in operating position adjacent an aircraft being loaded.

FIG. 2 shows an enlargement of a portion of the loader of FIG. 1 including a level sensor connected between the loader and the aircraft.

FIG. 3 shows an enlarged cross sectional view of the sensor connected between the aircraft and the platform of a pallet loader.

FIG. 4 is a schematic block diagram of circuitry used to sense any difference in level between the aircraft and the loader platform and to correct the position of the loader platform relative to the aircraft.

FIG. 5 is a program table which shows correlation between the input signals and the output signals in a portion of the circuitry shown in FIG. 4.

DESCRIPTION OF THE PREFERRED EMBODIMENT

A simplified cargo loader 10 (FIG. 1) includes a drive section 11 mounted on a frame section 12. A scissor mechanism 16 and a hydraulic lift cylinder 17 are connected between the frame section 12 and a platform 18 for raising and lowering platform 18 and proving a stable support for the platform. Platform 18 may include a roll plane deck surface equipped with pallet support rollers (not shown) and drive belt modules for moving a plurality of containers 22 between the platform 18 and an aircraft 23.

The hydraulic cylinder 17 (FIG. 1) provides power for raising and lowering the platform 18 relative to the frame section 12. A pair outer corners C1, C2 of the platform 18 are connected to move up and down with the upper portions 16a, 16b of the scissor mechanism 16. A third corner (not shown) of the platform is also connected to move up and down with movement of the scissor mechanism 16. A hydraulic cylinder 24, connected between a fourth corner C4 of the platform and an upper portion 16d of the scissor mechanism, moves the fourth corner C4 up and down independently of the scissors mechanism 16.

Up and down movement of the aircraft 23 relative to the platform 18 (FIG. 1) can be sensed by an umbilical cord 29 (FIGS. 2, 3) connected between the platform and the aircraft by an associated sensing and control circuit 30 of FIG. 4. The flexible cord 29 includes a tubular portion 34 partially filled with a conductive liquid such as mercury and having a plurality of electrode switches 35a-35j (FIGS. 3, 4) mounted near one end of the tubular portion. One end of the cord 29 is pivotally connected to the corner C4 of the platform 18 (FIG. 3) and the other end of the cord is removably connected to the aircraft 23 by a suction cup 36. A lever 40 (FIGS. 2, 3) opens and closes a valve (not shown) in the suction cup 36 to facilitate connecting and disconnecting the suction cup to the aircraft 23. The lever 40 also operates a switch 41 (FIG. 4) which provides a signal which indicates that the suction cup is attached to the aircraft 23.

The switches 35a-35j (FIGS. 3, 4) are pins which are mounted in the tube 34 with one end of each pin connected to a debouncing circuit U2 and the other end of each pin selectively connected to ground when the level of the mercury increases to a height where the mercury contacts the corresponding pin. A plurality of light emitting diodes (LEDs) 42a-42k are mounted in a rack 46 with each of the LEDs connected to one of the switches 35a-35j. When the end 29a of the umbilical cord 29 is in a lowered position the mercury in the tube 34 is lowered so that only one or two of the switches 35a-35j are closed by the mercury contacting the pins and only one or two of the LEDs are illuminated thus telling the operator that the suction cup 36 is in a position below the center or preferred position. As the suction cup 36 is raised more of the LEDs are illuminated until the LEDs 42e and 42f are illuminated which indicates that the suction cup 36 is in the center or preferred position. Signals from the switches 35a-35j are coupled through the debouncing circuit U2 to the processor U1 where the signals are stored in the processor U1 when the umbilical cord is positioned by the suction cup 36 on the side of the aircraft 23. Any up or down movement of the aircraft 23 causes a different number of the switches 35a-35j to be closed which provides a signal to processor U1 and processor U1 provides output signals on leads 48a-48d. Signals on these leads 48a48d are coupled to solenoids (not shown) which provide hydraulic power to hydraulic cylinders 17 and 24 to keep the platform 18 (FIG. 1) level in relation to the aircraft 23. The debouncing circuit U2 smoothes signals from switches 35a-35j caused by erratic movement of mercury in tube 34. One debouncing circuit which can be used in the present invention is the octal latch number 54LS377 made by Motorola Inc., Phoenix, Ariz. One processor U1 which can be used in the present invention is the Signetics Model S82S153F manufactured by Signetics Corporation, Sunnyvale, Calif.

Clock signals for operating the octal latch U2 and the processor U1 are developed by an oscillator 52 having a timer 53. A commonly used timer is the NE555 which is manufactured by a variety of companies and is widely available off the shelf.

A pair of switches 54a, 54b (FIG. 4) are mounted on a control panel 58 (FIG. 1) for choosing either a manual or an automatic operation. When switches 54a, 54b are in the center position shown in FIG. 4 a signal from switches 54a, 54b is coupled through a NOR-gate 55 to the processor U1 causing processor U1 to control the height of the loading platform 18 (FIG. 1) and keep platform 18 level with the aircraft 23. When the switches 54a, 54b are in the upper position signals on a signal line 64 cause platform 18 to be raised and when switches 54a, 54b are in the lower position signals on line 64 cause platform to be lowered.

A switch 59 (FIG. 4) can be moved to any of three positions with a first position causing the apparatus to operate in a manual mode, in the second position of switch 59 the processor causes the height of the platform 18 to track along with the height of the aircraft 23. When the switch 59 is in the upper position both the tracking of the height and of the pitch of the aircraft is followed by the position of the platform 18. In order for the pitch of the platform to follow the pitch of the aircraft a second umbilical cord 29a (FIG. 1) is connected on the other side of a cargo hatch 60 and another set of switches similar to switches 35a-35j must be connected to a plurality of input leads 65a-65e of the octal latch U2. This causes the processor U1 to provide signals which actuates the hydraulic cylinder 24 causing the portion of the platform 18 adjacent the aircraft to be tilted so that the inboard end of platform 18 follows the pitch of the aircraft 23 as well as following the height of the cargo hatch 60 of aircraft 23.

To understand the operation of the circuit of FIG. 4 it should be understood that signals on the input leads at the bottom of octal latch U2 are smoothed and each coupled to a corresponding output lead directly above the input lead. For example, signals from input lead "3" are available on output lead "2", etc. Also when switches 54a, 54b are in the center or automatic position NOR-gate 55 provides a positive signal on input lead 15 which causes processor U1 to control the position of platform 18 (FIG. 1) in response to the operation of switches 35a-35j. When switches 54a, 54b are in the upper or lower position NOR-gate 55 provides a ground signal which disables processor U1. When switch 59 is in the upper position a ground signal on input lead 17 of processor U1 causes processor U1 to control both height and pitch of platform 18 (FIG. 1). When switch 59 is in the center position a ground signal on input lead 16 causes processor U1 to control only height of the platform 18, and when switch 59 is in the lower position manual control of the platform is used.

Figure 5:
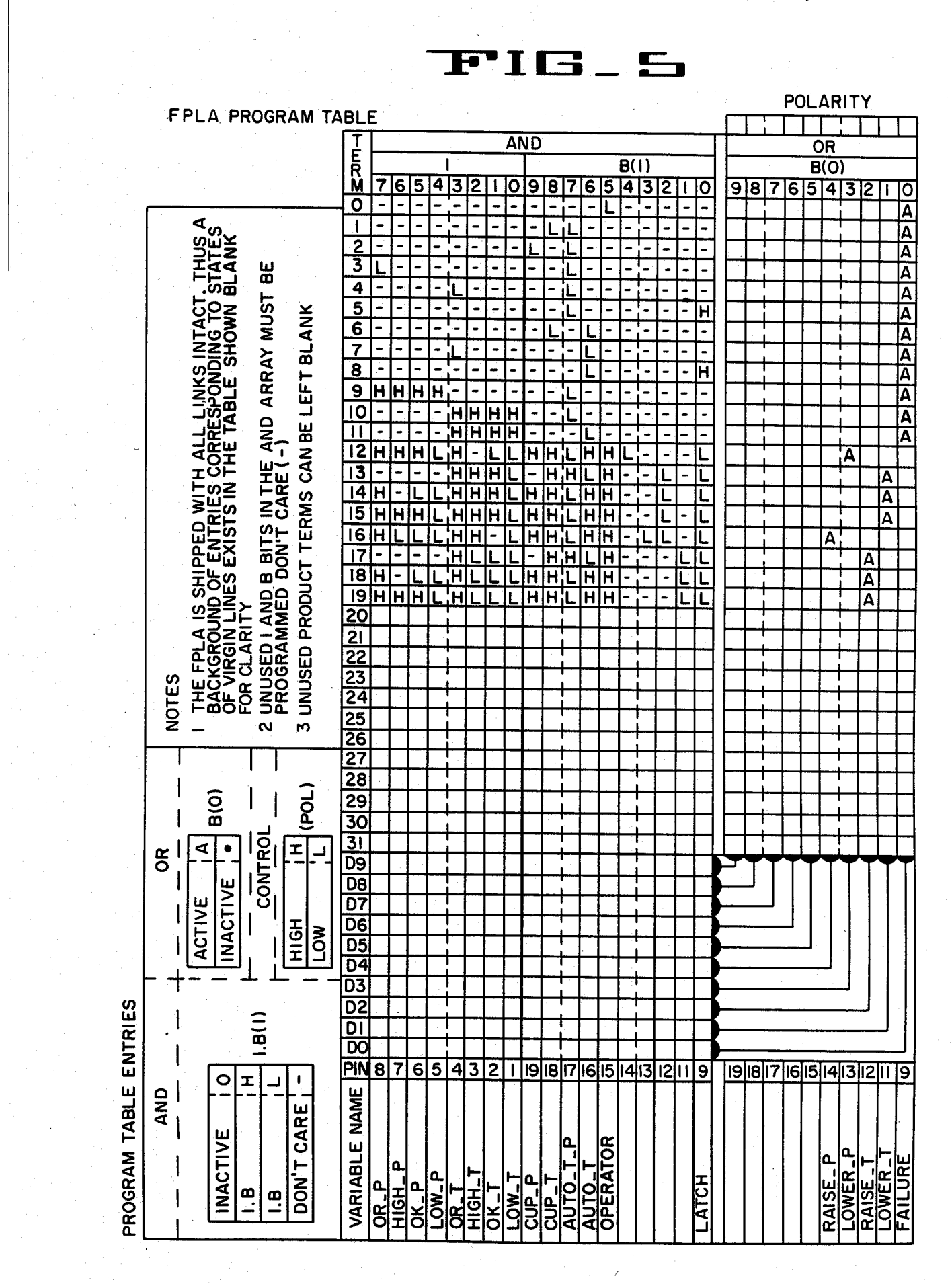

FIG. 5 is a program table which discloses the outputs of the processor U1 in response to inputs from switches 35a-35j which are closed according to the various levels of the aircraft 23 (FIG. 1) relative to the level of the platform 18. The table includes a left "input" portion and a right "output" portion separated by a blank column. Near the bottom of the table is a row which indicates pin numbers for input or output signals in the corresponding column. By checking the high "H" or low "L" signals on input pins 5-8 or pins 1-4 of processor U1 the output signals from processor U1 can be determined on output pins 9, 11-19 in the output portion of the table. For example, when the aircraft 23 (FIG. 1) is considerably lower than the platform 18 all of the switches 35a-35j (FIG. 4) are ungrounded, as they are not making contact with the mercury, so pins 1-4 of the processor U1 are high. This corresponds to item 11 of the program table (Fig. 5) where pins 1-4 are listed as "H". The output on pin 9, at the extreme right hand column, of item 11 lists an "A" or active output which indicates a failure or a condition which is outside the operating range of processor U1. The other output pins have no output signals.

If the suction cup 36 is raised or if the platform 18 is lowered, the mercury closes some of the switches 35a-35j. For example, if the platform is lowered slightly one of electrode switches 35a-35j is grounded so pin 1 of processor U1 has a low "L" signal at item 15 and output pin 11 shows an "A" in column 11 which indicates that platform 18 should be lowered. It should be mentioned that the second umbilical cord would also indicate that the aircraft is low so pin 5 of item 15 also indicates an "L" output. The program of FIG. 5 has been previously loaded into the processor U1 to provide the needed output signals on pins 9, 11-14 to operate hydraulic motors for raising and lowering the platform 18 (Fig. 1) in response to input signals from switches 35a-35j (FIG. 4).

The present invention provides means for causing an inboard end of a loading platform to follow both the height and pitch of an adjacent aircraft by connecting a pair of umbilical cords between the platform and the aircraft. The platform is not connected to the aircraft. The pair of unbilical cords provide signals which actuate a pair of hydraulic cylinders that move the platform into alignment with the aircraft.

Although the best mode contemplated for carrying out the present invention has been herein shown and described, it will be apparent that modification and variation may be made without departing from what is regarded to be the subject matter of the invention.

What is claimed is:

1. An automatic level device for positioning a platform of a cargo loader in alignment with a cargo hatch of an aircraft and for maintaining an inboard end of said platform in said alignment when said aircraft moves up and down, said device comprising:

a first hydraulic cylinder connected between a frame portion of said loader and said platform for raising and lowering said platform;

a first level sensor having a flexible tube partially filled with a conductive liquid and having a plurality of electrodes spaced along a first end of said tube, said liquid making contact with a different number of said electrodes as the height of either end of said tube changes to provide signals which indicate the height of a first end of said first sensor relative to a second end of said first sensor;

means for connecting said first end of said first sensor to said inboard end of said platform;

means for selectively connecting said second end of said first level sensor to said aircraft; and means for using said sensor signals to actuate said first cylinder for adjusting the height of said platform to maintain said inboard end of said platform in alignment with said cargo hatch.

2. An automatic level device as defined in claim 1 including visual means for indicating the height of said first end of said sensor relative to the height of said second end of said sensor.

3. An automatic level device as defined in claim 1 including a second level sensor having a flexible tube partially filled with a conductive liquid and having a plurality of electrodes spaced along a first end of said tube, said liquid making contact with a different number of said electrodes as the height of either end of said tube changes to provide signals which indicate the height of a first end of said second sensor relative to a second end of said second sensor, means for connecting a first end of said first sensor to a first inboard corner of said platform, means for connecting a first end of said second sensor to a second inboard corner of said platform, means for connecting said second ends of said first and second sensors to spaced portions of said aircraft and means for using signals from said first and said second sensors to raise and lower said first inboard corner of said platform to maintain said inboard end of said platform in alignment with said cargo hatch as said aircraft tilts.

4. An automatic level device as defined in claim 3 wherein said means for raising and lowering said first inboard corner of said platform includes a second hydraulic cylinder connected between said first inboard corner of said platform and said frame portion of said loader.

5. An automatic level device as defined in claim 1 including a source of electrical potential and means for coupling said source to said liquid to provide a signal to each of said electrodes which makes contact with said liquid.

6. An automatic level device as defined in claim 1 including a plurality of light emitting diodes, means for connecting each of said diodes to a corresponding one of said electrodes in said tube, a source of electrical potential, means for connecting said source to each of said diodes, said source energizing a number of diodes corresponding to the number of electrodes making contact with said liquid.

* * * * *